United States Patent
Konrad et al.

(10) Patent No.: US 7,174,228 B2
(45) Date of Patent: Feb. 6, 2007

(54) FIELD DEVICE WITH DISPLAY

(75) Inventors: Michael Konrad, Pfronten (DE); Dieter Schmidt, Nesselwang (DE)

(73) Assignee: Endress + Hauser Wetzer GmbH + Co. KG, Nesselwang (DE)

(*) Notice: Subject to any disclaimer, the term of this patent is extended or adjusted under 35 U.S.C. 154(b) by 0 days.

(21) Appl. No.: 11/258,913

(22) Filed: Oct. 27, 2005

(65) Prior Publication Data

US 2006/0036339 A1    Feb. 16, 2006

Related U.S. Application Data

(63) Continuation of application No. 10/189,000, filed on Jul. 5, 2002.

(60) Provisional application No. 60/317,439, filed on Sep. 7, 2001.

(30) Foreign Application Priority Data

Jul. 6, 2001   (EP) ................................. 01116427

(51) Int. Cl.
*G05B 15/00* (2006.01)
*G05B 15/02* (2006.01)

(52) U.S. Cl. ............................................. 700/83; 700/9

(58) Field of Classification Search ................ 700/115, 700/96, 108, 112, 110, 83, 9, 204; 709/106; 707/10; 718/106
See application file for complete search history.

(56) References Cited

U.S. PATENT DOCUMENTS

| | | | | |
|---|---|---|---|---|
| 4,599,166 A | * | 7/1986 | Gesslauer | 210/96.1 |
| 4,599,239 A | * | 7/1986 | Wieland et al. | 426/590 |
| 5,068,116 A | * | 11/1991 | Gibney et al. | 426/231 |
| 5,206,818 A | | 4/1993 | Speranza | |
| 5,314,703 A | * | 5/1994 | Gibney et al. | 426/231 |
| 5,325,852 A | * | 7/1994 | Clem | 137/91 |
| 5,388,761 A | * | 2/1995 | Langeman | 239/1 |
| 5,479,359 A | | 12/1995 | Rogero | |
| 5,537,914 A | * | 7/1996 | Gibney et al. | 99/323.2 |
| 5,552,171 A | * | 9/1996 | Gibney et al. | 426/231 |
| 5,656,313 A | * | 8/1997 | Gibney et al. | 426/231 |
| 5,839,094 A | | 11/1998 | French | |
| 6,026,352 A | | 2/2000 | Burns et al. | |
| 6,064,372 A | | 5/2000 | Kahkoska | |
| 6,095,682 A | * | 8/2000 | Hollander et al. | 374/121 |

(Continued)

FOREIGN PATENT DOCUMENTS

DE    297 09 029 U1    5/1997

(Continued)

*Primary Examiner*—Thomas Pham
(74) *Attorney, Agent, or Firm*—Bacon & Thomas

(57) ABSTRACT

A display for on-site visualization of conditions of an automated process is disclosed. It comprises a display controller which at least temporarily provides a state indication signal representing a constellation of states of at least two process data signals. At least one of the two process data signals is derived from a signal generated externally to the field device. The field device has a display element which responds to a change in the state indication signal with a significant change in its appearance, thus signaling the constellation of the states of the two process data signals in a visually perceptible manner. Therefore, the field device is particularly suited for on-site monitoring of entire plants or sections thereof by operating personnel.

32 Claims, 2 Drawing Sheets

U.S. PATENT DOCUMENTS

| | | | |
|---|---|---|---|
| 6,186,193 B1 * | 2/2001 | Phallen et al. ................. | 141/83 |
| 6,212,937 B1 | 4/2001 | Hubert | |
| 6,297,785 B1 * | 10/2001 | Sommer et al. ............. | 345/1.1 |
| 6,795,798 B2 | 9/2004 | Eryurek et al. | |
| 2004/0098218 A1 | 5/2004 | Ito et al. | |

FOREIGN PATENT DOCUMENTS

| | | |
|---|---|---|
| DE | 1 083 410 A2 | 9/2000 |
| DE | 1 273 890 A1 | 7/2001 |
| GB | 2 253 701 A | 9/1992 |
| GB | 2 318 982 A | 5/1998 |
| GB | 2 331 581 A | 5/1999 |

* cited by examiner

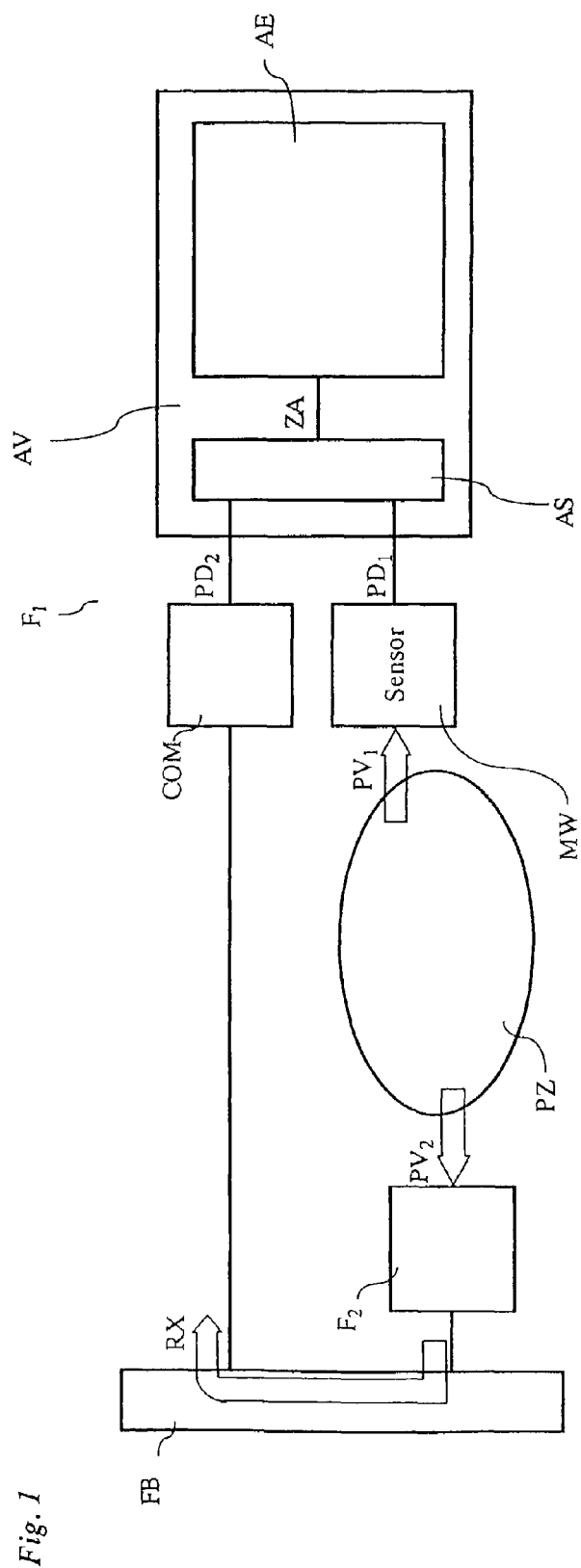

FIELD DEVICE WITH DISPLAY

This invention relates to a field device with a display for on-site visualization of conditions of an automated process.

The control and monitoring of automated processes in the chemical, pharmaceutical, process, and other industries is increasingly being effected from control rooms, to which large amounts of process data generated within the respective plant are transmitted, e.g., via field buses.

To generate such process data, use is commonly made of a large number of field devices installed at or in the immediate vicinity of the process, such as measuring instruments, control equipment, and/or data storage devices, which can supply the corresponding measured and/or control variables in the form of standardized analog or digital signals.

In spite of the fact that the interpretation of process data is nowadays performed essentially with the aid of computers, particularly remote from the field, operative on-site monitoring, i.e., monitoring by operating personnel in the plant, is often necessary and usually prescribed. Therefore, such process data generated in the field will continue to be visualized not only in control rooms but also directly at the field devices providing these process data, particularly in fully automated plants.

For the on-site visualization of individual process data, different types of display elements, such as bar-graph or digital displays, particularly liquid crystal displays, have proved effective. Also, display elements of the kind known from pointer instruments are still being widely used. Aside from the on-site visualization of the measured variable proper, commercially available field devices often provide for on-site visualization of selected field device data, such as device error messages or parameters representing current device configurations.

A problem associated with such on-site operative monitoring is that, on the one hand, the process data necessary in the increasingly complex plants for the description of the conditions to be monitored are increasing in volume, while, on the other hand, an interpretation of the process data in the sense of an assignment to one of the conditions to be monitored can be performed "manually" by operators on site only for process data sets of small volume.

Aside from the fact that such process data sets are frequently much too large for comprehensive on-site operative monitoring, fast, particularly simultaneous, visual perception of the relevant data by operating personnel is often not possible since the respective field devices and, thus, their display elements are generally far apart, so that they cannot be viewed simultaneously.

Against this background, namely that, on the one hand, data of an automated process are increasingly being used to monitor plants or sections thereof on site as completely as possible while, on the other hand, simultaneous perception and interpretation of all process data representing the respective condition of the plant has so far been possible on site only conditionally, the invention has for its object to provide a field device with a display whereby such conditions can be signaled to operating personnel acting on site in a visually easily perceptible manner, thus making automated processes easier accessible to on-site operative monitoring.

To attain this object, the invention consists in a field device with a display for on-site visualization of conditions of an automated process, said display comprising:

a display controller
which receives at least a first process data signal and a second process data signal and
which at least temporarily provides a state indication signal representing a constellation of states of at least one of the two process data signals,
at least one of the two process data signals being derived from an external signal generated externally to the field device; and
a display element of variable appearance
which visually signals via its appearance a constellation of the states of the two process data signals, and
which responds to a change in the state indication signal with a significant change in its appearance.

In a first preferred embodiment of the invention, the display controller at least temporarily provides a value indication signal representing an instantaneous value of one of the two process data signals, and the display element responds to the value indication signal by at least temporarily presenting this signal value in a visually perceptible manner.

According to a first preferred development of the invention, one of the two process data signals is derived from a transducer signal generated inside the field device.

In a second preferred embodiment of the invention, the display element comprises a light-emitting means of adjustable hue for illuminating a display background, and the display element responds to the state indication signal by causing the light-emitting means to illuminate the display background in a hue which signals the condition currently being represented by the state indication signal.

According to a second preferred development of the invention, the light-emitting means illuminates the display background in a hue which was selected from a store of discrete hue values by means of the state indication signal.

In a third preferred embodiment of the invention, the external signal is fed to the field device through a communications interface.

A fundamental idea of the invention is, in addition to or instead of providing a conventional on-site indication of individual process data, particularly of measured or control variables, to signal constellations of states of two or more process data signals, and thus individual ones of a plurality of predefined conditions, including error or alarm conditions, of the process to be monitored, on site in a visually perceptible manner.

The invention is predicated on recognition that because of increasingly complex process structures and sequences of process steps along with predominantly automated evaluation, particularly evaluation performed "remote from the field", checks to be performed by operating personnel on site will be made less and less with a view to fulfilling control tasks designed to operate the plant in an optimum condition. In future, such checks will rather be increasingly performed in order to monitor the plant as a whole also on site and thus detect any critical or hazardous conditions in individual sections of the plant as early as possible. This will then permit fast initiation of suitable countermeasures, particularly intervention by operating personnel acting on site.

By a condition-dependent colored illumination of the respective background of display elements commonly used in such field devices, the process conditions can be signaled so as to be clearly visible to operating personnel in a very advantageous manner, even from a great distance.

The invention will become more apparent from the following description of embodiments taken in conjunction with the accompanying drawings. Like reference characters have been used to designate like elements throughout the various figures of the drawings; previously used reference characters have not been repeated in subsequent figures if this contributes to clarity. In the drawings:

FIG. 1 shows schematically a field device for processing at least two process data signals;

FIG. 2 shows schematically components of the field device of FIG. 1; and

Figure 3:
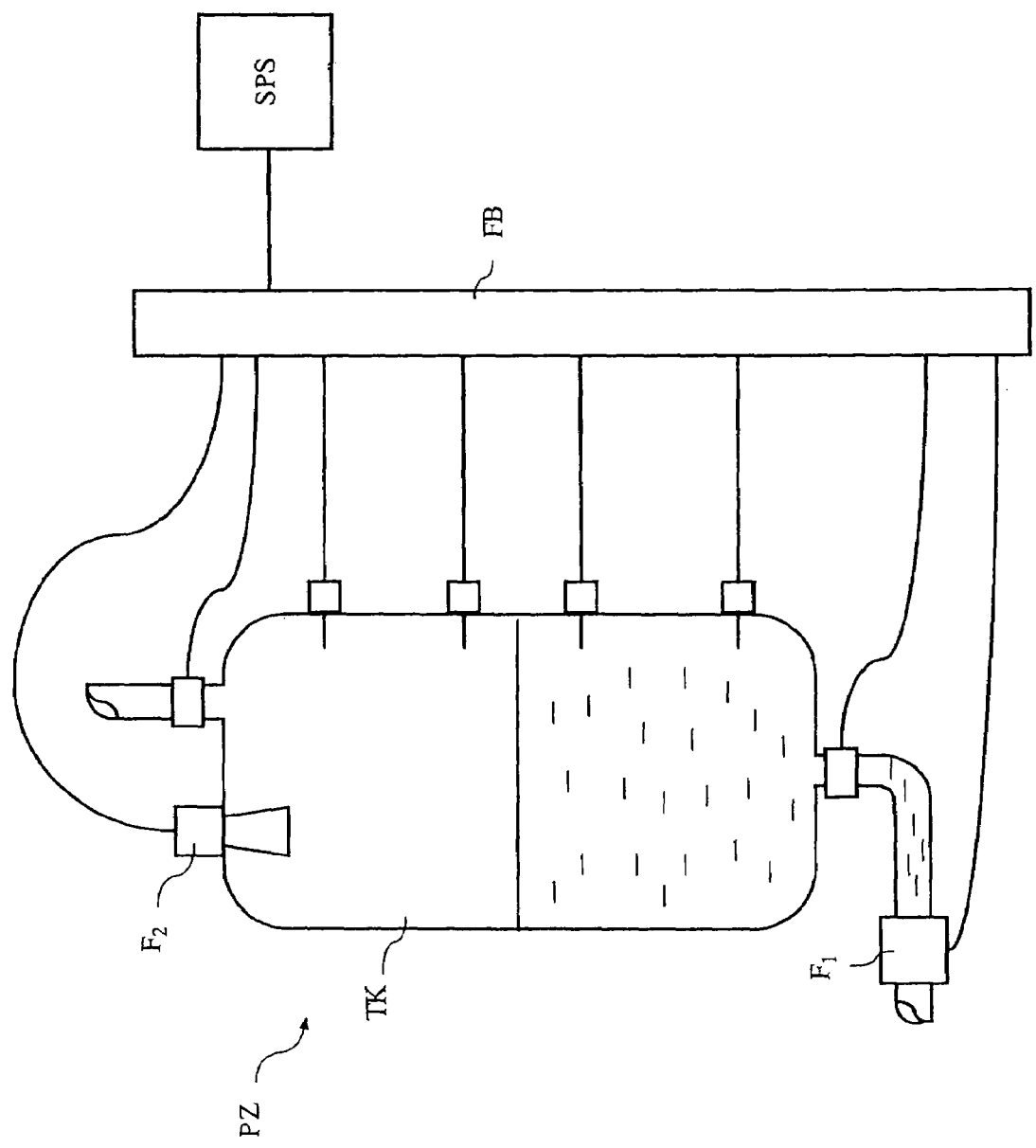
FIG. 3 shows schematically an application of the field device of FIG. 1.

Referring to FIGS. 1 and 2, there is shown a field device $F_1$ which, according to the invention, serves to visualize conditions of a process PZ, particularly of an automated process, on site. Field device $F_1$, as indicated in FIG. 1, may be a device which is installed in a plant implementing the process PZ and which senses at least a first physical or chemical process variable $PV_1$, such as a level meter, a mass flowmeter, a pH meter, a pressure gage, or a limit detector. However, field device $F_1$ may also be a data recording device installed on site, i.e., in the plant, or an actuator acting on the process PZ, such as a valve or a pump.

Preferably, field device $F_1$ is connected to a field bus FB, particularly a serial field bus, via which it communicates with a stored-program control located close to the field, with a control room, or with other field devices. Therefore, field device $F_1$ includes a communications interface COM which serves to couple the device to field bus FB and is adapted to the respective communications protocol used.

For on-site visualization of process conditions, field device $F_1$ comprises a display AV with a display element AE of variable optical appearance and with a display controller AS for display element AE.

Display controller AS serves to generate from a first process data signal $PD_1$ and at least a second process data signal $PD_2$ a state indication signal ZA, preferably a discrete signal, which controls the display element AE and represents an instantaneous constellation of the states of the two process data signals $PD_1$, $PD_2$.

According to the invention, at least one of the at least two process data signals $PD_1$, $PD_2$ is derived from an externally generated signal RX, particularly from a signal generated by a second field device $F_2$. As shown schematically in FIG. 1, the external signal RX may also be, for example, a measurement signal provided by the second field device $R_2$ and representing a second process variable $PV_2$, which measurement signal is transmitted via field bus FB to the first field device $F_1$, where it is converted by communications interface COM to the process data signal to be processed, $PD_2$.

In a preferred embodiment of the invention, the first process data signal $PD_1$ is a signal generated by means of a transducer MW of field device $F_1$ and representing the first process variable $PV_1$. If field device $F_1$ is an actuator, process data signal $PD_1$ may also be a control signal generated by a control element of field device $F_1$, for example.

In the embodiment shown schematically in FIG. 3, the first field device $F_1$ is a mass flowmeter which can be mounted on a discharge pipe of a liquid tank TK, and measures the mass flow rate of a liquid flowing through the pipe. A level meter mounted above a maximum tank level serves as a second field device $F_2$. Besides communicating with the second field device $F_2$, the first field device $F_1$, as shown schematically in FIG. 3, may exchange process data with, and particularly process further process data signals $Pd_m$ from, a plurality of further field devices.

For the plant section shown, an optimum condition could be defined, for example, when tank TK is filled up to between 30 and 80% and neither inflow nor outflow of liquid is being sensed. Further constellations representative of the optimum process condition could be signaled, for example, when outflow is being sensed and tank TK is filled up to at least 40%, or when inflow is being sensed and tank TK is filled up to a maximum of 60%. By contrast, a critical condition could be defined, for example, for a liquid level above 90% with no inflow being sensed or for a liquid level of less than 20% with no outflow being sensed. Also, a condition in which tank TK is filled up to 80% and inflow is being sensed or in which tank TK is filled to less than 20% and outflow is being sensed, for example, could be a critical condition. An overcritical or alarm condition for the plant section shown would have to be signaled, for example, when tank TK is empty or nearly overfilled.

To generate the state indication signal, display controller AS comprises an evaluation stage AwS. The latter serves to perform a rule-based interpretation of an instantaneous constellation of states of the applied process data signals $PD_1$, $PD_2$, i.e., a translation of a set of instantaneous values of process data signals $PD_1$, $PD_2$ into a state value signal ZW representing the condition to be signaled. Such an interpretation of signal states may be accomplished with the aid of predefined interpretation or translation rules which are represented in evaluation stage AwS by means of suitable arithmetic units. The arithmetic units in evaluation stage AwS are advantageously implemented, for example, with a microcomputer and programs stored and executed therein. It may prove to be advantageous if the aforementioned interpretation rules can be adapted, e.g., from a control room via field bus FB, to any changes in the process.

To convert the state value signal ZW to the state indication signal ZA, display controller AS includes a driver stage TrS coupled to evaluation stage AwS.

Preferably, driver stage TrS, as indicated schematically in FIG. 2, is connected via a set of n binary inputs to corresponding parallel binary outputs of evaluation stage AwS, which deliver an instantaneous value of state value signal ZW in the form of a simple digital word. A conceivable allocation of signal values to the individual process conditions could be as follows: a signal value of "100" for a detected optimum condition, a signal value of "010" for a detected critical condition, and a signal value of "001" for a detected overcritical condition.

The state indication signal ZA derived from the instantaneous value of the state value signal ZW may be generated by arranging that driver stage TrS selectively activates individual or two or more parallel supply lines VL for display element AE and thus influences the appearance of the latter in the manner described above. The state indication signal thus generated then corresponds to a respective pattern of currently activated supply lines VL.

The state indication signal ZA and the display element AE driven by it are so adapted to one another that display element AE responds to an essential change in the state indication signal ZA, i.e., to a change corresponding to a change in the process PZ from a previously existing condition to another condition, in a predeterminable manner with a significant change in its appearance.

For the display element AE, liquid crystal displays (LCDs) or thin-film transistor (TFT) displays may be used, for example, which are familiar to those skilled in the art. If necessary, display element AE may be of the type commonly used in pointer instruments, i.e., an element with a scale and a pointer driven by a movement, as is disclosed in EP-A 1 083 410, for example.

According to a further development of the invention, the change in the appearance of display element AE is implemented by causing the display element AE to light up, at least in segments, in a hue of adjustable value assigned to the respective condition to be signaled, the respective hue value being selected from a store of discrete hue values by means of the state indication signal. A conceivable color coding for the individual process conditions would be, for example, if the display element showed green upon detection of an optimum condition, yellow upon detection of a critical condition, and red upon detection of an overcritical condition. Instead of or in addition to a color-coded signaling of the process conditions, display element AE may present the current condition by outputting a correspondingly assigned designation and/or a correspondingly assigned index number in the form of a text message.

For the color-coded signaling of the current process condition, particularly to make the signaling visible from a great distance, in a further preferred embodiment of the invention, display element AE comprises a light-emitting means LED of adjustable hue. Light-emitting means LED preferably serves to illuminate a display background, particularly completely, in the hue that signals the condition currently being represented by state indication signal ZA. Particularly in that case, it is advantageous to use for the display element AE a liquid crystal display implemented in STN (Super Twisted Nematic), DSTN (Double Super Twisted Nematic), or CCSTN (Color Coded Super Twisted Nematic) technology. The background of display element AE may then be illuminated in the above-described manner with light-emitting means LED in the form of an array of differently colored light-emitting diodes or in the form of differently colored light-emitting films. Another embodiment of a suitable display element AE in the form of a liquid crystal display is described in the above-mentioned EP-A 1 083 410, for example.

According to a further advantageous development of the invention, display element AE is driven at least temporarily by a value indication signal WA which represents an instantaneous value of the second process data signal $PD_2$. Value indication signal WA is also provided by display controller AS, particularly by the driver stage TrS thereof, and serves to change the appearance of display element AE so that it presents the signal value in a visually perceptible manner. The representation of the instantaneous value of process data signal $PD_2$ may be implemented, for example, with the above-mentioned liquid crystal or TFT display or with the above-mentioned movement-driven pointer moving over the scale.

The generation of value indication signal WA and, hence, the display of the signal value may be initiated, for example, by on-site operating personnel via a suitable input interface, e.g., a keyboard communicating with display controller AS, particularly with evaluation stage AwS; cf. EP-A 1 079 291, in which a readout display unit with a display element is described which is incorporated in a field device but not connected to a field bus, and by which manually selected measured variables generated by different field devices can be displayed one after the other.

The invention claimed is:

1. A field device installed in a plant implementing an automated process, said field device comprising:
    a display controller which receives at least a first process data signal representing a first process variable from said automated process and a second process data signal representing a second process variable from said automated process, at least said second process data signal being derived from an external signal generated externally to the field device; and
    a display element for on-site visualization of process data, said display element being controlled by said display controller based on said first and second process data signals, wherein:
    said display controller at least temporarily provides a value indication signal representing an instantaneous value of said second process data signal; and
    said display element at least temporarily presents said signal value in a visually perceptible manner.

2. The field device as claimed in claim 1, wherein:
    said display controller further provides a state indication signal at least temporarily, which represents a constellation of states of at least one of the two process data signals; and
    said display element visually signals via its appearance a constellation of the states of the two process data signals.

3. The field device as claimed in claim 2, wherein:
    said display element responds to a change in the state indication signal with a significant change in its appearance.

4. The field device as claimed in claim 3, wherein:
    said display element comprises a light-emitting means of adjustable hue for illuminating a display background; and
    said display element responds to the state indication signal by causing the light-emitting means to illuminate the display background in a hue which signals the condition currently being represented by the state indication signal.

5. The field device as claimed in claim 1, further comprising:
    a transducer, wherein:
    said first process data signal is a signal generated by means of said transducer.

6. The field device as claimed in claim 5, wherein:
    the field device is selected from a group consisting of level meter, mass flowmeter, pH meter, pressure gages, limit detector, valves and pumps.

7. The field device as claimed in claim 1, wherein:
    said external signal is generated by another field device.

8. The field device as claimed in claim 1, wherein:
    the field device being connected to a field bus, and
    said external signal is transmitted to the field device via said field bus.

9. The field device as claimed in claim 8, wherein:
    said external signal is generated by another field device connected to said field bus.

10. A system for monitoring an automated process, said system comprising:
    at least two field devices installed in a plant implementing said automated process, a first one of said field devices generating a first process data signal representing a first process variable and a second one of said field devices generating a second process data signal representing a second process variable, wherein:
    the first one of said field devices derives from said first and said second process data signals a state indication signal representing a predefined process condition of said automated process.

11. The system as claimed in claim 10, wherein:
    said first one of said field devices at least temporarily provides a value indication signal representing an instantaneous value of one of the two process data signals.

12. The system as claimed in claim 10, wherein:
for generating the first process data signal, said first field device comprises a transducer.

13. The system as claimed in claim 10, wherein:
the first one of said field devices is selected from a group consisting of level meter, mass flowmeter, pH meter, pressure gages, limit detectors, data recording devices, valves and pumps.

14. The system as claimed in claim 10, further comprising:
a field bus, wherein: said at least two field devices are connected to said field bus.

15. The system as claimed in claim 14, wherein:
said second process data signal is transmitted to said first one of said field devices via said field bus.

16. The plant section as claimed in claim 14, wherein the display element visually signals via its appearance a constellation of the two process data signals.

17. The system as claimed in claim 10, wherein:
at least said first one of said field devices comprises a display element for on-site visualization.

18. The system as claimed in claim 17, wherein:
said display element is implemented in a technology selected from a group consisting of: Super Twisted Nematic technology (STN), Double Super Twisted Nematic technology (DSTN), Color Coded Super Twisted Nematic technology (CCSTN).

19. The system as claimed in claim 17, wherein:
said display element comprises a light-emitting means of adjustable hue for illuminating a display background; and
said display element responds to the state indication signal by causing the light-emitting means to illuminate the display background in a hue which signals the condition currently being represented by the state indication signal.

20. The system as claimed in claim 17, wherein:
said first one of said field devices at least temporarily provides a value indication signal representing an instantaneous value of said second one of said two process data signals; and
said display element responds to the value indication signal by at least temporarily presenting this signal value in a visually perceptible manner.

21. A plant section, comprising:
a tank having a discharge pipe; and
at least two field devices communicating with each other, a first one of said field devices being installed on said discharge pipe of said tank and generating a first process data signal, which represents an outflow from said tank, and a second one of said field device being mounted above a maximum tank level and generating a second process data signal, which represents a fill level in said tank wherein:
at least one of said two field devices includes a display element of variable appearance; and said display element is controlled based on said first and second process data signals.

22. The plant section as claimed in claim 21, wherein:
said at least one field device including said display element provides a value indication signal representing an instantaneous value of said one process data signal generated external said one field device including said display element.

23. The plant section as claimed in claim 22, wherein:
said display element responds to the value indication signal by at least temporarily presenting said signal value in a visually perceptible manner.

24. The plant section as claimed in claim 21, wherein:
for generating said first process data signal, said first field device comprises a transducer.

25. The plant section as claimed in claim 21, wherein:
said first one of said field devices is a mass flowmeter; and
said second one of said field devices is a level meter.

26. The plant section as claimed in claim 21, further comprising:
a field bus, wherein: said at least two field devices are connected to said field bus.

27. The plant section as claimed in claim 26, wherein:
said second process data signal is transmitted to said first one of said field devices via said field bus.

28. The plant section as claimed in claim 27, wherein:
said field bus is a serial field bus.

29. The plant section as claimed in claim 21, further comprising:
at least one further field device for sensing an inflow into said tank.

30. The plant section as claimed in claim 21, further comprising:
at least one further field device for sensing an inflow into said tank, and,
a field bus wherein:
each of said field devices are connected to a field bus.

31. A method for monitoring a tank, the method comprising steps of:
using a first field device installed on a discharge pipe of said tank for generating a first process data signal representing an outflow from said tank;
using a second field device mounted above a maximum tank level for generating a second process data signal representing a fill level in said tank;
generating from said first and said second process data signals a state indication signal representing a predefined condition of said tank to be monitored; and
using said state indication signal for controlling a display element of at least one of said first and second field devices visually signalling said predefined condition of said tank.

32. A field device installed in a plant implementing an automated process, said field device comprising:
a transducer;
a display controller which receives a process data signal representing a process variable from said automated process, said process data signal being generated by means of said transducer; and
a display element for on-site visualization of process data, wherein:
said display element is controlled by said display controller based on said process data signal, and
said display element comprises a light-emitting means of adjustable hue for illuminating a display background.

* * * * *